Figure 1:
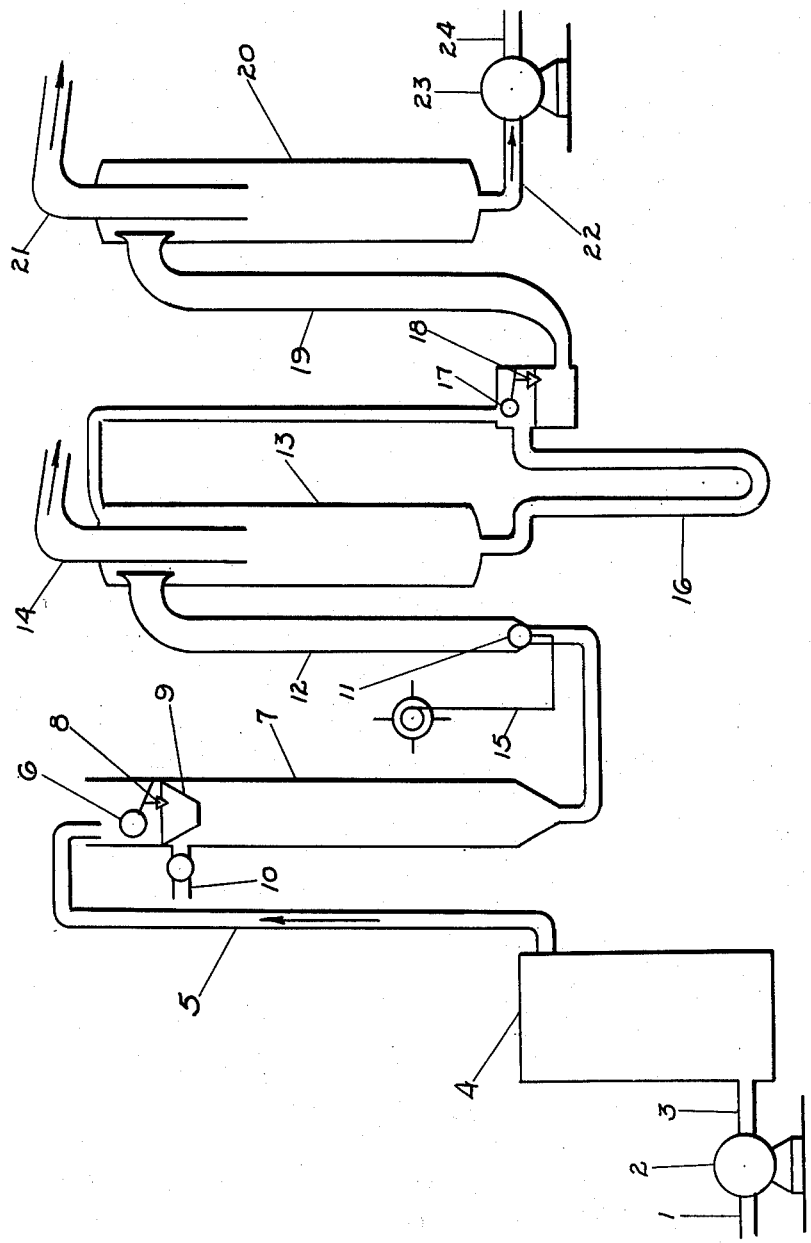

July 25, 1950 — F. S. BOARD ET AL — 2,516,099
PROCESS FOR TREATING POTABLE LIQUIDS
Filed May 17, 1946 — 2 Sheets-Sheet 1

Francis S. Board
Roy P. Robichaux
Inventors
By E. F. Wenderoth
Attorney

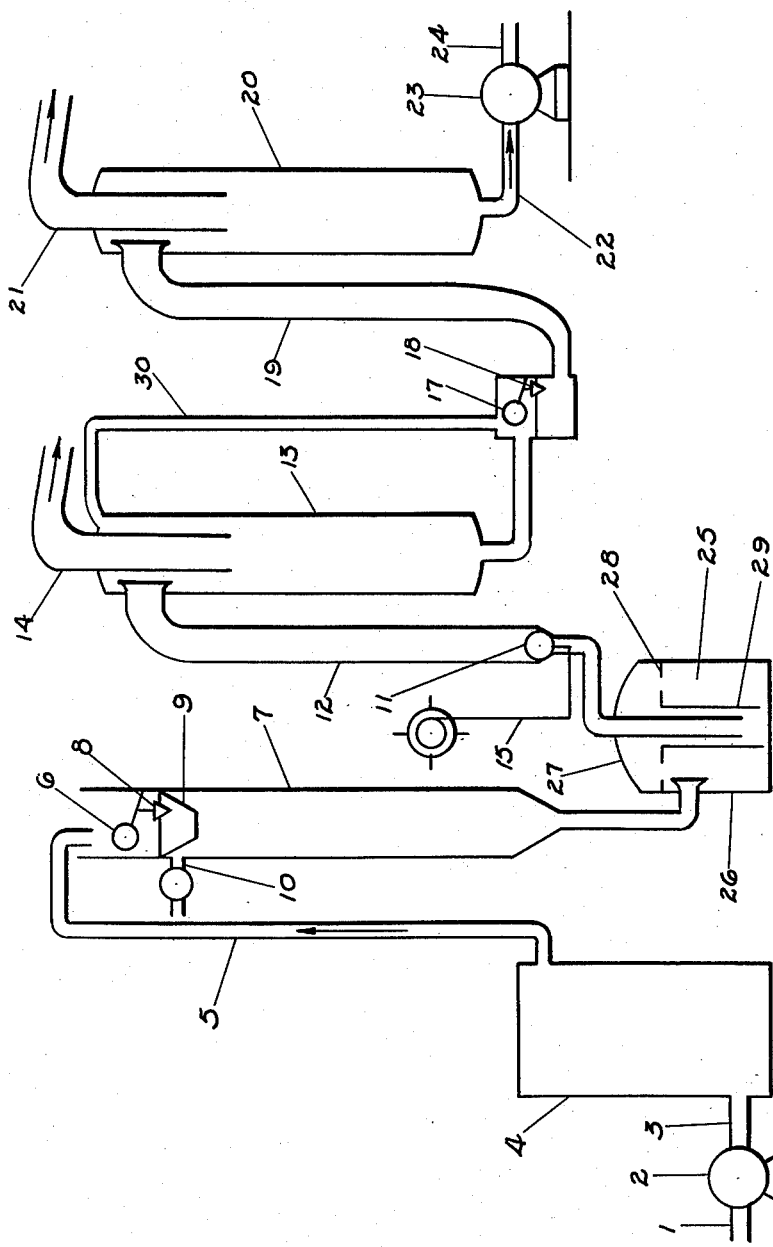

Patented July 25, 1950

2,516,099

UNITED STATES PATENT OFFICE 2,516,099

PROCESS FOR TREATING POTABLE LIQUIDS

Francis S. Board and Roy P. Robichaux, Chicago, Ill., assignors to Murray Deodorizers Ltd., Auckland, New Zealand Application May 17, 1946, Serial No. 670,416

5 Claims. (Cl. 99—212)

This invention relates to improvements in a process for treating liquids, such, for example, as milk, cream, other lacteal fluids, ice cream mix, edible oils, fruit and vegetable juices, etc.

More specifically, this invention relates to improvements in a process for pasteurizing or processing such liquids under vacuum and to the system for performing such process, whereby to preserve the food value of the liquids, preserve and improve the flavors thereof and increase their keeping qualities.

Still more specifically, this invention, when adapted for the processing of such lacteal liquids as milk and cream, contemplates the subsequent conversion of the milk into cheese or the separation of cream from the milk.

The heretofore known, continuous methods of processing liquids while under the influence of vacuum, in which the liquids may be exposed to predetermined pasteurization temperatures, employ the principle of moving the liquid being processed rapidly, whereby the overall period of time consumed in the performance of the process is of the nature of a few seconds. In the prior art methods of continuously processing or pasteurizing liquids under vacuum to obtain the proper pasteurization or heat treatment of liquids, such, for example, as edible oils, fruit and vegetable juices, and milk, in which processing or pasteurization it is desired to insure the destruction of pathogenic organisms, and in which the liquid being treated is, of necessity, exposed to pasteurization temperatures only for a very short period of time, it has been found necessary to perform such processing or pasteurizing operations at high temperatures within the range of 180° F. to 205° F. It has been found, however, that exposure of lacteal liquids, such as milk, cream, ice cream mix, edible oils, fruit and vegetable juices, to high temperatures within the mentioned range, in certain instances may destroy some of the desirable physical and chemical properties of such liquids.

Raw milk contains the fat-splitting enzyme lipase. Lipolytic activity in milk, by hydrolyzing the milk fat, produces a rancid flavor and odor attributed to the liberation of butyric acid and other fatty acids of low molecular weight.

In the heretofore known methods of continuously pasteurizing milk at high temperatures and under the influence of vacuum, it has been impossible to effect desired degrees of control upon the lipolytic activity within the pasteurized or processed milk.

One of the prime objectives of our present invention is, therefore, to provide a method of processing liquids, such as milk, cream, other lacteal fluids, ice cream mix, edible oils, fruit and vegetable juices; in which process the liquid may be continuously pasteurized under the influence of a predetermined degree of vacuum at a high temperature within the range of approximately 150° F. to 200° F., preferably within the temperature range of 160° F. to 183° F.; wherein the liquid may be pasteurized continuously under vacuum and at a high temperature while maintaining the desired degree of control over the lipolytic activity within the milk; wherein the body of the cream separated from the thus pasteurized milk is improved; wherein the milk pasteurized by the improved process may be converted into various types of cheese, such, for example, as blue-vein types of cheese, as well as non-blue-vein types of cheese; and in which the milk, while being processed, is protected from the detrimental effects of light.

A further object of our present invention is to provide an improved process for continuously pasteurizing and steam distilling liquids, such as milk, cream, ice cream mix, edible oils, fruit and vegetable juices, in which the time and temperature factors of pasteurization may be selected and regulated independently one of another over a substantially wide range of temperature as, for example, temperatures within the range of 150° F. to 205° F., and the time factors within the range of four minutes to 15 seconds and less.

Another object of our invention is to provide an improved method for continuously processing liquids of the type heretofore mentioned under sub-atmospheric pressures, wherein each particle of the liquid being processed or pasteurized is retarded or maintained uniformly at a predetermined pasteurizing temperature for a predetermined length of time, while nonetheless avoiding the under-treatment or over-treatment of the particles of the liquid being processed.

A still further object of our present invention is to provide an improved method for continuously processing liquids of the type heretofore mentioned, wherein all or substantially all of the pathogenic organisms and other undesirable constituents of the liquid are rapidly destroyed or removed from the liquid by economical and interrelated operations while the liquid is being processed in the absence of light or detrimental high temperatures, while retaining substantially all of the desirable physical and chemical characteristics, food value and flavor of the liquid thus processed.

Another object of our present invention is to provide an improved method of heat-treating lacteal and other liquids of the type heretofore mentioned, whereby a predetermined degree of control may be effected upon the activity of the enzymes, such as lipase and phosphatase, in the processed product, while retaining the desirable physical and chemical properties of the processed liquid.

A still further object of our invention is to provide a system whereby our improved process may be economically and efficiently performed.

The foregoing objects and other important features of our present invention will become more apparent upon a review of the following specifications and claims, which, for the purpose of clarity, but without limitation of the invention, shall be read with reference to the accompanying drawings, in which:

Figure 1 is a diagrammatic representation of the preferred combination of apparatus for the performance of the improved process of continuously treating liquid under the influence of vacuum; and Figure 2 is a diagrammatic representation of an alternative arrangement of apparatus adapted for use in the processing of liquids according to the present invention.

Referring to the drawings, in which like elements are identified by like numerals, and referring particularly to Figure 1, of the drawings, a conduit 1 serves to supply liquid to be treated from any suitable source of supply (not shown). Conduit 1 communicates with pump 2 for forcing the liquid received from conduit 1 through connecting pipe 3 to and through a preheating device 4. The preheating device 4 may be of any conventional type of liquid heating device, such as a conventional, internal tube type of heater or an open vat type of heater.

From the preheating device 4, the liquid is discharged through connecting conduit 5 into the receiving chamber 6 positioned above the vacuum compartment of the vacuum chamber 7.

From the receiving chamber 6, the liquid drains through an aperture controlled by float valve 8 into a distributing head 9 positioned in the upper portion of the vacuum chamber 7. From the distributing head 9, the liquid flows through the vacuum chamber 7, finely dispersed substantially throughout the cross section of the chamber 7. In the vacuum chamber 7, the finely dispersed liquid is intimately and gently mixed with steam, introduced into the upper portion of the chamber 7 through the steam supply conduit 10. The manner of securing the gentle mixing of steam and the liquid being processed is illustrated in the Murray Patents No. 2,091,606 and No. 2,325,534. The mixture of the steam and finely dispersed particles or droplets of liquid in the chamber 7 substantially instantaneously raises the temperature of the particles of liquid to the temperature of the steam, which corresponds to the degree of vacuum or sub-atmospheric pressure existing within the vacuum chamber 7.

The degree of vacuum or sub-atmospheric pressure existing within the vacuum chamber 7 is controlled by the valve 11 positioned within the conduit 12, which connects the first vacuum chamber 7 with the second vacuum chamber 13. The vacuum chamber 13 is partially exhausted through a conduit 14 communicating at one end with the upper portion of the chamber 13 and communicating at its opposite end with any suitable, regulatable means of exhaustion, such, for example, as an ejector-condenser or a vacuum pump or the like (not shown). The difference in pressures between the first vacuum chamber and the second vacuum chamber 13 determines the velocity of flow of the intermingled steam and liquid, that is, the heated liquid, from the lower portion of the chamber 7 through the conduit 12 into the upper portion of the second vacuum chamber 13. The difference in pressure between the chambers 7 and 13 is controlled by the appropriate adjustment of the valve 11, whereby the velocity of the flow of liquids or gases through the conduit 12 from the chamber 7 to chamber 13 may be regulated.

The liquid heated within the first vacuum chamber or pasteurization chamber 7, the condensed steam, volatile gases which have been released from the liquid, and the uncondensed steam tend to pass or flow toward the lower portion of the chamber 7 and are drained therefrom through the conduit 12 by virtue of the higher degree of vacuum existing within the second vacuum or steam distillation chamber 13 through the conduit 12 and past the control valve 11. It has been found that a suitable spring tension element 15 may be used for applying the desired compressive force on the valve element 11 to urge the same toward a complementary valve seat whereby to control the velocity of flow of material from the pasteurization chamber 7 to the steam distillation chamber 13.

The heated mixture of liquid and gases discharged from the conduit 12 enters the steam distillation chamber 13 tangentially near the upper portion thereof, whereby the liquid, thus introduced into the chamber 13, is caused to swirl downwardly over the inner surface of the wall of the chamber 13, producing thereby a cyclonic action, tending to separate gases from liquids, thereby permitting the withdrawing of gases and other free volatile matters from the central portion of the chamber 13 through the exhaust conduit 14.

The heated mixture of liquid and remaining entrained gases, after passing downwardly over the inner wall of the chamber 13, accumulates in the lower portion thereof and from thence passes into and through a retarder 16 into an accumulating chamber 17. While passing through the retarder 16, the heated liquid is maintained at a predetermined temperature for a predetermined period of time. The temperature of the liquid upon entering the retarder 16 is determined by the quantity and temperature of the liquid supplied from the preheater 4, the quantity and temperature of the steam supplied from the steam conduit 10, and the degree of vacuum within the chambers 7 and 13. The period of time during which the liquid is retained within the retarder 16 is primarily determined by the selection of the proper length and cross-section of the retarder 16, and the volume of the liquid being treated. In this manner accurate determinations may be made with respect to the minimum interval of time which may elapse while a particle of liquid travels through the retarder 16 to the accumulating chamber 17.

From the accumulating chamber 17, the pasteurized and steam-distilled liquid passes through an aperture controlled by a float valve 18 into a conduit 19, from which it is tangentially discharged into the upper portion of a third vacuum or cooling chamber 20.

The vacuum chamber 20 is provided with an exhaust conduit 21, which, like exhaust conduit 14, for chamber 13, is associated with any suitable source of vacuum, such as an ejector-condenser, vacuum pump or the like (not shown). By means of such a suitable source of vacuum, desired degrees of vacuum may be secured and maintained within the chamber 20.

The pasteurized liquid, which has entered the upper portion of chamber 20 from the conduit 19, swirls downwardly over the inner face of the wall of the chamber 20, bringing about a cyclonic separation of the entrained gases remaining in the pasteurized liquid and cooling the liquid by evaporation of a portion thereof. The separated entrained gases and evaporated liquid are forced by the cyclonic separation action toward the inner portion of the chamber 20, from whence they are withdrawn through the exhaust conduit 21. The liquid which is swirled downwardly over the inner wall of the chamber 20 accumulates in the lower portion thereof and is withdrawn therefrom through conduit 22 by means of pump 23, which in turn forces the liquid through a discharge conduit 24 to a suitable station.

To cause the liquid to flow from the accumulator 17 through the float valve 18 and thence into and through the conduit 19 into the third vacuum or cooling chamber 20, it is necessary to maintain a greater degree of vacuum in the chamber 20 than is maintained in the second or steam distillation vacuum chamber 13. The proper operation of the float valve 18 is assured by the provision of a gas escape conduit, communicating at one end with the upper portion of the accumulating chamber 17 and at its opposite end with the upper portion of the steam distillation chamber 13.

The combination of apparatus particularly adapted for the performance of certain aspects of applicants' invention in an improved process for treating liquids, diagrammatically illustrated in Figure 2 of the drawings, differs from that illustrated diagrammatically in Figure 1 of the drawings only by the relative position of the retarding element and by certain constructional details of the retarder.

In the combination of apparatus diagrammatically illustrated in Figure 2 of the drawings, the liquid discharged from the vacuum chamber 7 passes directly into a retarder 25 prior to the introduction of the liquid into the connecting conduit 12, from which the liquid in turn is introduced into the upper portion of the second vacuum chamber 13. In the combination of apparatus, diagrammatically illustrated in Figure 2 of the drawings, the liquid discharged from the second vacuum chamber 13, passes directly into the accumulator 17. From the accumulator 17, the flow of the liquid is the same in either the combination of apparatus shown in Figure 1 of the drawings or the combination of apparatus shown in Figure 2 of the drawings.

As illustrated in Figure 2 of the drawings, the retarder 25 is interposed in the liquid flow stream between the first and second vacuum chambers 7 and 13, respectively. The material being processed, upon leaving chamber 7, consists of heated liquid, condensed steam, uncondensed steam, and other free volatile gases and vapors released from the liquid as a result of the heating and vacuum treatment thereof in chamber 7 and passes from the lower portion of chamber 7 into the upper portion of the retarder 25, entering thereinto tangentially to the inner face of the outer wall of the retarder 25. The tangential entry of the mixture into the retarder 25, as just mentioned, causes the liquid to swirl downwardly over the inner surface of the outer wall 26, producing a cyclonic separating action, wherein the gases and vapors are separated from the heavier constituents of the mixture. The gases and vapors thus separated within the retarder 25, which is sealed by cover 27, are forced toward the central portion thereof and escape therefrom by passing upwardly through the ports in a dividing disk 28, which is positioned near the upper portion of the retarder 25. The gases passing through the ports in the disk 28 accumulate in the upper portion of the retarder 25 and are thence drawn downwardly through a central tubular element 29 carried by the disk 28 and communicating at one end with the upper portion of the chamber 25. In the lower portion of the tubular element 29, the rapidly moving, escaping gas enters into the lower end of the conduit 12 to pass therethrough into the second vacuum chamber 13.

The liquid portion of the mixture, which has been separated from substantially all of the gaseous portion of the mixture by the cyclonic action within the retarder 25, accumulates in the lower portion of the retarder 25 until the level thereof reaches the lower end of the pipe 12. When the level of the liquid in the lower portion of the retarder 25 reaches the lower end of the pipe 12, the rapidly moving, escaping gas, upon entering the lower end of the pipe 12, draws with it particles of liquid from the upper surface of the liquid accumulated within the lower portion of the retarder 25. This operation, whereby the rapidly moving gas, escaping into the lower portion of conduit 12, draws with it particles of liquid from the upper surface of the accumulated liquid in the retarder 25, functions much in the fashion of an aspirator.

To regulate the period of time during which the liquid must be retained within the lower portion of the retarder 25 necessitates the selection of the proper dimensions for the retarder and the selection of the proper height at which the lower end of the conduit 12 is positioned from the bottom of the retarder 25, whereby to establish the quantity of liquid which must be accumulated within the chamber 25 before any of the liquid can escape therefrom. To prevent the gas from intermingling with the liquid in the lower portion of the retarder 25 at any point, excepting at the lower extreme end of the conduit 12, the conduit 29 extends downwardly to a point appreciably lower than the lower extremity of the conduit 12, but not into engagement with the bottom of the retarder 25.

The improved method of practicing applicants' invention may best be described by referring particularly to the processing or pasteurizing of lacteal fluid, such as milk. The invention is, however, not to be considered as limited to use in connection with the processing of lacteal fluid, the explanation of processing lacteal fluid being given purely as an example.

For the purpose of convenience, a general explanation of the method will also be given with particular reference to Figure 1 of the drawings. In apparatus of the type shown in that figure of the drawings, the lacteal liquid to be processed is supplied to the preheater 4 by means of pump 2 from a suitable source of supply and is preheated in the preheater 4 to a temperature within the range of 110° F. to 160° F. in the presence of a suitable quantity of an oxidizing agent, such as air. The oxidizing agent such as air or other suitable gas may be present in the milk in the form of entrained air or gas within the liquid or may be incorporated in the liquid by the use of an open atmospheric heater, by injection or otherwise.

From the preheater 4, the liquid passes into the accumulator portion 6 of the pasteurizing chamber 7. From the accumulator 6, and under the control of a float valve 8, the liquid passes into a distributor 9, from which, in turn, it is distributed in finely divided form or droplets into the upper portion of the vacuum or pasteurizing chamber 7.

While the liquid, in finely dispersed droplet form, moves downwardly toward the lower portion of the chamber 7, it is intimately and gently mixed with steam supplied to the upper portion of chamber 7 from the steam supply conduit 10, whereby the temperature of the liquid is substantially instantaneously raised to the temperature of the steam, comparable to the degree of vacuum existing within the chamber 7. The degree of vacuum existing within the chamber 7 is determined by the relative degree of vacuum existing in chamber 13 to which chamber 7 is connected by conduit 12, and the adjustment of the control valve 11 within the conduit 12. The degree of vacuum existing within the chamber 13 is determined by the setting of the vacuum-producing device associated with the exhaust conduit 14, communicating with the upper portion of the second vacuum or steam distilling chamber 13.

The liquid heated in the chamber 7 is retarded or maintained for a suitable period of time at a satisfactory pasteurizing temperature in a retarding device, such as member 16, in which pasteurizing is completed, and into which retarding device the heated liquid is introduced after first passing through the steam distillation chamber 13; or, as shown in Figure 2, the liquid is maintained or retarded in the retarding device 25 to complete the pasteurization thereof prior to the entry of the liquid into the steam distillation chamber 13. Suitable pasteurizing temperatures may vary between temperatures within the range of 140° F. and 200° F.

At the present time, accepted pasteurization standards permit the heat treatment of liquid, wherein the liquid is heated to a temperature of approximately 144° F. and maintained at that temperature for a period of approximately 30 minutes, or the liquid may be heated to a temperatuer of approximately 160° F. and held at that temperature for a period of approximately 15 seconds, or when necessary such additional period of time as to complete the desired pasteurization and retardation of the liquid. It therefore becomes apparent that the quantity and the temperature of the steam introduced through the steam supply conduit 10 into the upper portion of the pasteurizing chamber 7 must be so regulated as to produce in the finely dispersed milk falling through the chamber 7 a temperature slightly in excess of the desired pasteurizing temperature, having in mind the quantity and temperature of the preheated milk entering the pasteurizing chamber and the sub-atmospheric pressure existing within the pasteurizing chamber.

In those instances where the heated milk is also passed through the deaerating and steam distilling vacuum chamber 13 prior to introduction thereof into a retarder, such as retarder 16, suitable allowance must also be made for the additional cooling effect produced by the sub-atmospheric pressure condition existing within the second vacuum chamber 13.

After the milk has been completely pasteurized and partially deaerated by passing the same through the vacuum chambers 7 and 13 and a suitable retarding device, the milk is then promptly cooled and further deaerated by passing the pasteurized milk through a third or cooling vacuum chamber 20, and from thence to a suitable point of discharge.

It is especially to be noted that in the performance of the applicants' improved process of treating liquids, such as milk, as described in the foregoing portions of this specification, apparatus identical with that illustrated in the drawings is not at all necessary. The fundamental features of the improved process and apparatus necessary to perform our new method will be apparent to those skilled in the art. The fundamental and significant characteristics of the improved process pertain to the preheating of the liquid prior to the vacuum pasteurization thereof and to the retarding of the liquid for a suitable period of time under the influence of vacuum to complete the pasteurization or heat treatment process without interrupting the continuous features of the process.

According to applicants' invention, the pasteurization temperatures and the corresponding time periods may each be selected and regulated independently of each other, and the steam distillation of the liquid which takes place primarily in the second vacuum chamber, as well as the cooling and further steam distillation of the liquid which takes place in the third vacuum chamber, are also subject to accurate regulation.

In the pasteurization of liquids at atmospheric pressures or at sub-atmospheric pressures, the relation of the time and the temperature factors must be considered. Many methods of pasteurization have been developed in which the temperature-time factors vary from a temperature factor of approximately 140° F. and a time factor of approximately 35 minutes to a temperature factor of approximately 200° F., and a time factor not to exceed a few seconds. The prior art apparatus and processes have enabled the selection of desired time-temperature combinations between these extremes when operated under atmospheric pressures in both the batch type of process and the continuous type of process.

The selection of the desired time-temperature relationships have, however, not heretofore been possible with prior art apparatus and methods employing the principle of continuous vacuum pasteurizing. Neither has the prior art taught a continuous vacuum pasteurizing method, in which the time-temperature factors may be varied and selected at will.

The present invention enables the attainment of the benefits of regulated time-temperature factors, both with respect to the pasteurization of liquids and the steam distillation of the liquids being processed. According to the present improved method, which may be practiced on the combination of apparatus such as illustrated, for example, in Figures 1 and 2 of the drawings, wherein the processing of the liquid occurs under sub-atmospheric pressures, it now becomes possible to pasteurize liquid and to bring about the steam distillation thereof at any selected temperature within the range of approximately 140° F. to 200° F., and at any selected time factor within the range of approximately 140° F. to 200° F., and at any selected time factor within the range of approximately 4 minutes to 15 seconds, or less, and to select and regulate these time-temperature factors independently one of another. To those versed in the art of vacuum pasteurization and steam distillation of liquids, particularly lacteal fluids, the potential advantages accruing from the versatility of the new process will be immediately apparent. However, to clarify the details of the applicants' invention in an improved method of processing liquids, several specific uses of the invention will now be given.

In the heat treatment of milk according to applicants' invention, preparatory to the separation of cream therefrom, the milk, which under normal conditions may have been held in a refrigerated storage tank (not shown), is supplied by pump 2 to the preheater 4, wherein in the presence of an oxidizing agent, such as air, it is heated to a temperature of approximately 145° F. The manner in which the oxidizing agent may be made available has heretofore been pointed out. After the milk has been satisfactorily preheated, the preheated milk passes to the float chamber 6 of the vacuum or pasteurizing chamber 7. From the float chamber 6, the preheated milk is precipitated in finely divided form, such as droplets, into the vacuum compartment of the vacuum chamber 7. The passage of the milk from float chamber 6 into the vacuum chamber 7 is controlled by float valve 8. In the vacuum chamber 7, the preheated milk is intimately and gently mixed with steam supplied by conduit 10 to the upper portion of the vacuum chamber 7. The temperature of the preheated milk, while passing through the vacuum chamber 7, is promptly raised by the steam to a temperature preferably within the range of approximately 165° F. to 175° F., the quantity and temperature of the steam and the quantity and temperature of the preheated milk being so adjusted as to secure the desired temperature within the range of 165° F. to 175° F. within the chamber 7, due allowance being made for the sub-atmospheric pressure condition existing within the chamber 7.

Assuming, for the purpose of this specific example, that the apparatus being used is of the type diagrammatically illustrated in Figure 1 of the drawings, the sub-atmospheric pressure condition existing within the chamber 7 must be adjusted to a sub-atmospheric pressure within the range of 19 inches of mercury to 16 inches of mercury. From the chamber 7 the heated milk is drawn through conduit 12 past the control valve 11 into the second vacuum or steam distillation and deaerating chamber 13. The milk, upon entering the chamber 13 from the conduit 12, is introduced tangentially against the inner wall of the second vacuum chamber 13 and swirls downwardly in a cyclonic action toward the lower portion of the chamber 13, thereby bringing about a separation of an appreciable quantity of the uncondensed steam, vapor and other volatile gases released from the liquid constituent of the mixture and the steam distillation of the milk. The separated vapors and gases pass out of the chamber 13 through the conduit 14 to the means whereby the vacuum is produced within the chamber 13. The degree of vacuum existing within the chamber 13 is within the range of approximately 25 inches of mercury to 17 inches of mercury. From the vacuum chamber 13, milk which has been cooled somewhat by the effect of the increased vacuum within chamber 13 passes from the lower portion of that chamber into a tube-like retarding device 16, wherein the milk is retarded or maintained at a temperature of approximately 162° F. for a period of time of approximately 15 seconds to insure the destruction of the pathogenic organisms present in the milk and to control substantially all of the lipolytic activity within the milk to thereby effect satisfactory pasteurization.

From the retarder 16, the completely pasteurized milk flows into the accumulator 17, from which it enters a conduit 19. The entrance of the pasteurized milk into the conduit 19 is controlled by the float valve 18. From the conduit 19, the milk is tangentially discharged into the upper portion of the third, or cooling, vacuum chamber 20, wherein the milk swirls downwardly over the inner surface of the outer wall of the chamber 20 to bring about a further steam distillation and cyclonic separation of the liquid, vapors and other gases present in the milk, which during such separation action are released toward the central portion of the chamber 20, from which in turn they pass, by means of conduit 21, to the exhauster or vacuum producing means (not shown).

The degree of vacuum existing within the third or cooling vacuum chamber is within the range of approximately 29 inches of mercury to 18 inches of mercury. The pasteurized and cooled milk is withdrawn from the lower portion of the chamber 20 to conduit 22 by means of the discharge pump 23, and is pumped thereby through discharge conduit 24 to any desired station for separation.

By the pasteurization, steam distillation and heat treatment of lacteal liquids, such as market milk, table cream and ice cream mix, in accordance with the specific example just described for the treatment of market milk, temperatures lower than those usually employed in the flash pasteurization methods have been made possible. By this improved method of pasteurizing milk, damage to the cream line of the milk is prevented, interference with other physical and chemical properties of the milk have been avoided, and the food value and flavor characteristics of the milk have been retained. It has been found that by the pasteurization of market milk in the specific example just described, the body of the cream separated from such milk is substantially improved and the physical properties of the butterfat and milk solids are retained.

In the event that it is desired to use a combination of apparatus such as shown in Figure 2 of the drawings for the pasteurization of market milk, preparatory to the separation of cream, the relation of the temperatures and pressures within the first and second vacuum chamber need only be so regulated as to insure the satisfactory pasteurizing temperature of the milk retarded within the retarder 25.

For example, the liquid may be preheated to a temperature within the range of 110° F. to 160° F. in the preheater 4, then further heated in the pasteurizing chamber 7 to a temperature within the range of 160° F. to 185° F. while under the influence of a vacuum within the range of 21 inches of mercury to 12 inches of mercury. The liquid may then be maintained or retarded at a suitable pasteurizing temperature within the range of approximately 160° F. to 185° F. for a period of time approximately 15 seconds and then introduced into the steam distillation chamber 13 under the influence of a vacuum within the range of approximately 25 inches of mercury to 13 inches of mercury. From the steam distillation chamber 13, the pasteurized milk may then be introduced into the cooling chamber 20, and cooled and further deaerated while under the influence of a vacuum of approximately 29 inches of mercury to 14 inches of mercury.

In view of the fact that the flow of the milk or other liquid being processed from the supply chamber 6 to and through the vacuum chambers 7, 13, and 20 is controlled and brought about entirely by the effect of the degree of vacuum existing within these three chambers, there must be of necessity an appropriate relation in the degree of vacuum existing in these three chambers. That relation must be such that the greatest vacuum exists in chamber 20 and the least vacuum exists in chamber 7, and the degree of vacuum existing in chamber 13 must be intermediate those existing in chambers 7 and 20.

In the manufacture of blue-vein type of cheese by the use of our improved process, it is possible satisfactorily to pasteurize the milk and yet control the lipolytic activity within the milk. For the manufacture of blue-vein cheese, it is desired to maintain substantially unimpaired the lipolytic activity within the milk, as contrasted with the objective with respect to lipolytic activity in the pasteurization of milk for other purposes, such, for example, as the pasteurization of milk preparatory to the separation of cream or preparatory to the making of a non-blue vein type of cheese, such as cheddar cheese, in which latter two instances it is normally desired to destroy substantially all of the lipolytic activity within the milk.

Referring particularly to Figure 2 of the drawings, milk to be pasteurized preparatory to the making of blue-vein cheese may be introduced directly without preheating into the accumulating compartment 6 of the first vacuum chamber 7. From the accumulating chamber 6, the milk is drawn into the vacuum compartment of the chamber 7 under the control of float valve 8 and descends through the chamber 7 in finely dispersed, droplet form under the influence of a vacuum within the range of 19 inches of mercury to 16 inches of mercury, during which time it is gently but thoroughly mixed with steam supplied from the conduit 10, whereby to raise substantially instantaneously the temperature thereof to a value within the range of approximately 160° F. to 170° F.

The manner in which the desired degree of vacuum is secured within the chamber 7 has heretofore been described. From the lower portion of chamber 7, the heated milk passes into the retarder 25 where it is held at a temperature preferably of approximately 162° F. for a time of approximately 15 seconds to complete the pasteurization thereof. From the retarder 25, the completely pasteurized milk passes through conduit 12 past the control valve 11 into the second vacuum or steam distilling and deaerating chamber 13. In the passage of the pasteurized milk through the chamber 13, it is subjected to an increased degree of vacuum within the range of 25 inches of mercury to 17 inches of mercury.

From the second vacuum or steam distillation and deaerating chamber 13, the pasteurized and deaerated milk enters conduit 19 by means of the collecting chamber 17 under the control of the float valve 18. From the conduit 19, the liquid is drawn into the third vacuum or cooling chamber 20, wherein it is subjected to further cyclonic separating action and deaerating and evaporation and cooling under the influence of a vacuum within the range of 29 inches of mercury to 18 inches of mercury. The pasteurized, deaerated, steam-distilled, cooled milk is finally withdrawn from the lower portion of chamber 20 and directed by pump 23 through discharge pipe 24 to a suitable station, whereupon the milk thus treated may then be made into blue-vein cheese.

Obviously, apparatus of the type shown in Figure 1 of the drawings or similar apparatus may be used with equally satisfactory results for the processing of milk preparatory to the making of blue-vein cheese, it being necessary only to make the suitable adjustments in temperatures and degrees of vacuum within the chambers 7, 13 and 20, so as to secure the desired pasteurizing temperatures of the milk within the retarder 16. The important factor to be noted with respect to the processing of milk preparatory to the making of blue-vein cheese is that the milk is not preheated to a high temperature preparatory to the introduction thereof into the vacuum pasteurizing chamber 7.

It has been found desirable in the heat treatment or pasteurization of milk preparatory to the manufacture of blue-vein cheese, like the heat treatment of milk preparatory to the separation of cream therefrom, to preheat the milk immediately preceding the pasteurization thereof. Such preheating of the milk when used either for the manufacture of blue-vein cheese or when done preparatory to the pasteurization of milk immediately preceding the separation of cream therefrom prevents the unnecessary dilution of the milk by the condensing of excessive quantities of steam in the pasteurization operation.

In the manufacture of blue-vein cheese, therefore, it has been found desirable to preheat the milk in the preheater 4, to a temperature of approximately 110° F. Such preheating of the milk, as just mentioned, prevents to some extent the dilution of the milk by condensed steam in the pasteurization operation, enables the satisfactory pasteurization without impairing the lipolytic activity within the milk, and without detrimentally affecting the other physical and chemical properties of the milk.

In the pasteurization of milk preparatory to the separation of cream therefrom, it has, however, been found desirable to preheat the milk to a temperature of approximately 145° F. to insure the destruction of substantially all of the lipolytic activity within the milk by the subsequent heating and holding operations which take place in the pasteurization process which follows the preheating operation.

In the pasteurization of milk preparatory to the manufacture of non-blue-vein type of cheese, such as cheddar cheese and the like, it is also desired to destroy substantially all of the lipolytic activity within the milk. The present invention, therefore, contemplates that milk to be used in the manufacture of non-blue-vein type cheese is first preheated in the preheater 4 to a temperature of approximately 140° F. in the presence of a suitable quantity of an oxidizing agent, such as air. Such oxidizing agent may be supplied to the milk in the manner aforementioned in this specification, or sufficient quantities may be present in the milk in the form of entrained air or other entrained or injected gas or gases. After the milk has been preheated to a temperature of approximately 140° F., the preheated milk is introduced through the accumulating chamber 6 into the vacuum compartment of the chamber 7 under the control of the float valve 8, and is then distributed into finely divided droplet form by the distributor 9 and descends through the chamber 7 in intimate mixture with a suitable quantity of steam supplied by conduit 10, whereby the temperature of the milk is substantially instantaneously raised to a temperature within the range of approximately 162° F. to 182° F. Such a rise in temperature takes place while the liquid descends through the chamber 7 under the influence of a vacuum within the range of 20 inches of mercury to 12 inches of mercury.

When using apparatus of the type diagrammatically illustrated in Figure 1 of the drawings, the heated milk is drawn from chamber 7 through pipe 12 into the steam distilling and vacuum chamber 13 in the manner heretofore described. In the chamber 13, the milk, while under the influence of vacuum within the range of 21 inches of mercury to 13 inches of mercury, is cooled slightly, steam distilled and partially deaerated. From the second chamber 13, the heated milk is withdrawn from the lower portion thereof into the retarder 16, while the vapors and gases are withdrawn from the chamber 13 through the exhaust conduit 14. In the retarder 16, the milk is maintained at a temperature of approximately 160° F. for a period of time of approximately 15 seconds, whereby to insure the proper pasteurization thereof and the destruction of the pathogenic organisms within the milk and the destruction of substantially all of the lipolytic activity within the milk. From the retarder 16, the milk is drawn into the third vacuum chamber 20, wherein it is promptly cooled and further deaerated under the influence of a vacuum within the range of 29 inches of mercury to 14 inches of mercury. The completely pasteurized, deaerated and partially cooled milk is discharged from the chamber 20 to a suitable point of discharge in the manner heretofore described, whereupon it may then be made into a non-blue-vein type cheese.

Similar to the processing of milk preparatory to the separation of cream therefrom, or preparatory to the manufacture of blue-vein cheese, milk to be manufactured into non-blue-vein type of cheese may be processed in apparatus either of the type diagrammatically illustrated in Figure 1 of the drawings or the type diagrammatically illustrated in Figure 2 of the drawings.

To those skilled in the art, it will immediately be apparent that in processing milk preparatory to the manufacture of non-blue vein type cheese in apparatus of the type illustrated in Figure 2 of the drawings slightly different temperatures and pressure relationships need to exist in the vacuum chambers 7, 13 and 20, from those mentioned for the practice of this specific example of our improved process in apparatus of the type shown in Figure 1 of the drawings.

In the processing of other food products, such as edible oils, fruit and vegetable juices, the same time-temperature relationships, as outlined in the foregoing specific examples of the use of our improved process, need not be adhered to. The appropriate time-temperature relationships will be apparent to or may be readily determined by those skilled in the art.

From the foregoing description of the several specific manners in which our invention may be used for the handling of liquids, such as, for example, milk, it will be apparent that our invention represents an appreciable forward step in the art of continuously heat treating liquids while under the influence of sub-atmospheric pressures.

Our new method of heat treating liquid provides a method for absolute and thorough pasteurization of the liquid, wherein substantially all of the physical and chemical properties of the liquid, such as milk, fruit and vegetable juices, and edible oils, while being treated, may be maintained, wherein the food value and flavor characteristics of the liquid are retained, and wherein a very wide degree of control of the activity of the enzymes, such as the lipolytic activity within the milk, is made possible.

The invention is hereby claimed as follows:

1. The method of heat treating lacteal fluids in a continuous once-through vacuum pasteurization process, which includes preheating the fluid for a short time interval under atmospheric conditions to a temperature within the range of approximately 110° F. to 160° F., subjecting the preheated fluid in finely divided form to the action of steam and raising the temperature of the fluid to approximately 162° F. to 185° F. while passing through a first vacuum zone ranging from approximately 20 to 12 inches of mercury, then passing the fluid through a second vacuum zone ranging from approximately 21 to 13 inches of mercury for withdrawing vapors and gases from the fluid, then holding the fluid at a suitable temperature at approximately 160° F. to 183° F. for not less than 15 seconds to complete pasteurization of, while substantially controlling the lipolytic activity within, the fluid, and then vacuum cooling the fluid.

2. The method of heat treating milk in a continuous once-through vacuum pasteurization process which includes preheating the milk for a short time interval and under atmospheric conditions to a temperature of approximately 145° F., subjecting the preheated milk in finely divided form to the action of steam and raising the temperature thereof to approximately 165° F. to 175° F. while passing through a first vacuum zone ranging from approximately 19 to 16 inches of mercury, then holding the thus further heated milk at a temperature of approximately 162° F. for not less than 15 seconds to complete pasteurization of, while substantially controlling the lipolytic activity within the milk, then removing vapors and gases from the milk in a second vacuum zone, wherein is maintained a vacuum in excess of the vacuum within the first vacuum zone, and finally cooling the milk under the influence of still higher vacuum.

3. In the method of making caseinous cheese, the steps of first subjecting the milk in finely divided form to the action of steam and heating the milk to a temperature within the range of 165° F. to 175° F. while passing through a vacuum zone ranging from approximately 19 to 16 inches of mercury, holding the milk at a temperature of approximately 162° F. for not less than 15 seconds while under the influence of a vacuum to complete pasteurization of, while maintaining unimpaired the lipolytic activity within the milk, then passing the milk through a vacuum zone ranging from approximately 25 to 17 inches of mercury, for withdrawing vapors and gases from the milk, and then vacuum-cooling the milk at a range of approximately 29 inches to 18 inches of mercury.

4. In the method of enzymic control in the continuous vacuum heat treatment of enzymic-containing lacteal fluids, while pasteurizing the same and while maintaining unimpaired the body and other desired good qualities of the fluid, the steps, in combination, of preheating the fluid under atmospheric conditions to about 110° F. to about 160° F. for a short time interval, and thereby exerting desired control of the enzymic activity without, however, initiating pasteurization, thereafter passing the preheated fluid into a first, pasteurizing zone at a pressure ranging from about 20 to 12 inches of mercury and intimately and gently commingling the fluid with steam, and heating the fluid to a pasteurizing temperature of about 162° F. to about 185° F. corresponding to the sub-atmospheric pressure therein, then passing the mixture of steam and fluid into a second, vaporization zone and there subjecting the liquid to a pressure ranging from about 25 to about 13 inches of mercury, removing the entrained steam and vapors from said second zone, then subjecting the fluid to a third cooling zone at a still greater vacuum, and between the first and third zones holding the fluid for not less than 15 seconds at approximately 160° F. to 185° F. temperature, under a pressure approximating as an upper limit the sub-atmospheric pressure maintaining in the immediately preceding zone.

5. In the method of heat treating lacteal fluids in a continuous once-through vacuum pasteurization process wherein the fluid is subjected to a treatment in a first, vacuum pasteurization zone, then subjected to a treatment in a second, intermediate vaporization zone, and then finally treated in a third, vacuum cooling zone, each of said zones being at an increasing vacuum, the step which consists in holding the liquid between the first and third zones for not less than 15 seconds at a temperature of about 160° F. to 185° F. while maintaining the pressure on such held liquid at approximately the upper limit of the sub-atmospheric pressure maintaining in the immediately preceding zone, to complete the pasteurization of the fluid, while maintaining unimpaired the lipolytic activity within the fluid.

FRANCIS S. BOARD.
ROY P. ROBICHAUX.

REFERENCES CITED

The following references are of record in the file of this patent:

UNITED STATES PATENTS

| Number | Name | Date |
|---|---|---|
| 1,819,023 | Grindrod | Aug. 18, 1931 |
| 2,020,309 | Grindrod | Nov. 12, 1935 |
| 2,014,580 | Murray | Sept. 17, 1935 |
| 2,089,132 | Murray | Aug. 3, 1937 |
| 2,130,643 | Hammer et al. | Sept. 20, 1938 |
| 2,130,644 | Hammer et al. | Sept. 20, 1938 |